Sept. 8, 1953   F. PIERCE   2,651,258
FIELD SENSITIVE HYDRAULIC APPARATUS
Filed Sept. 10, 1948

INVENTOR.
FIRTH PIERCE
BY
ATTORNEY

Patented Sept. 8, 1953

2,651,258

UNITED STATES PATENT OFFICE 2,651,258

FIELD-SENSITIVE HYDRAULIC APPARATUS

Firth Pierce, Altadena, Calif.

Application September 10, 1948, Serial No. 48,547

1 Claim. (Cl. 103—1)

(Granted under Title 35, U. S. Code (1952), sec. 266)

This invention relates to hydraulic apparatus, and more particularly to hydraulic apparatus and systems employing a fluid which is sensitive to fields such as an electro-magnetic field.

It is an object of this invention to provide hydraulic apparatus employing field sensitive fluid to facilitate the control and movement of the fluid in the hydraulic system.

It is another object of this invention to provide particular hydraulic devices for use in a hydraulic system employing field-sensitive fluids such as a ferro-magnetic fluid, i. e. a fluid exhibiting ferro-magnetic properties.

It is another object of this invention to simplify the control and movement of fluid in a hydraulic system.

It is a further object of this invention to control the flow and movement of fluid in a hydraulic system without the use of moving parts.

It is an additional object of this invention to provide control of fluid in a hydraulic system in continuously variable, non-discrete increments, without the employment of any moving parts.

It is a particular object of this invention to provide a valve for the control of field-sensitive fluid in a hydraulic system, particularly in a closed hydraulic system.

It is another particular object of this invention to provide a pump especially designed for the pumping of a field-sensitive fluid.

It is a further particular object of this invention to provide a pump, the capacity of which may be continuously varied without the employment of any movable control parts in the pump.

Other objects and many of the attendant advantages of this invention will be readily appreciated as the same becomes better understood by reference to the following description.

In accordance with the instant invention the hydraulic apparatus comprises a conduit system, preferably a closed system, filled with a field-sensitive fluid, such as a ferro-magnetic fluid, i. e. a fluid having ferro-magnetic properties. Such a fluid changes its viscosity under the influence of a field. When the fluid is a ferro-magnetic fluid, the viscosity increases markedly in a magnetic field, and if the walls of the conduit system are of ferro-magnetic material, the fluid tends to adhere to these walls. In operation, such a closed conduit system is subjected to a field (in appropriate cases, a magnetic field) which alters the flow characteristics of the fluid, and thereby leads to a continuously variable and easily applied means for controlling the flow of the fluid in the closed hydraulic system.

Exemplary of such hydraulic apparatus is a valve for field-sensitive fluid, the basic elements of which include a body having passage means for the flow of fluid through the valve, and means for establishing a field in the passage means to thereby control the flow of the field-sensitive fluid through the body of the valve. When the fluid is a ferro-magnetic fluid, the body preferably includes an electrical winding which is effective to create a magnetic field in the passage, and thereby markedly increase the viscosity of the fluid in the valve passage, to the point where, if desired, fluid flow may be completely blocked; or, preferably, may be merely impeded to any desired degree.

A further example of such hydraulic apparatus is a pump for field-sensitive fluid, the pumping capacity of which may be readily controlled by controlling the field strength applied by the pump to the fluid. In the preferred case of a ferro-magnetic fluid, the pump includes an electrical winding, the generated field strength of which may be varied by simply varying the current in the winding. In this way the capacity of the pump may be altered from zero to full capacity merely by the simple control of a rather minute current flowing through the pump winding. In the specific embodiment to be described hereinafter, the pump includes a shaft and a rotor, the rotor carrying the magnetizing means, so that the ferro-magnetic fluid adheres to the pump rotor and is drawn around through the pump body, being scraped from the rotor by a non-magnetic tongue or scraper secured to the pump casing.

Specific examples of apparatus embodying the various features of the instant invention will now be described in conjunction with the accompanying drawing, wherein.

Figure 1:
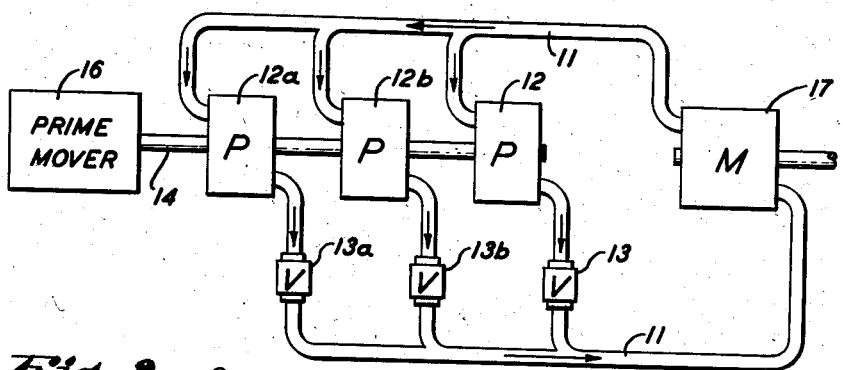
Fig. 1 is a schematic view of a closed hydraulic system, embodying the principles of the instant invention.

Referring to Fig. 1, 11 designates a closed conduit system, filled with a field-sensitive fluid, for example, a ferro-magnetic fluid. By ferro-magnetic fluid, used herein, is meant any fluid which exhibits ferro-magnetic properties so as to change its character when subjected to a magnetic field. An example of such a fluid is a mixture of oil and very finely divided iron particles which hang suspended in the oil so that the entire fluid tends to become somewhat homogeneous.

In the hydraulic system employing the conduit 11, there is placed a suitable fluid pump 12 and a fluid controlling valve 13. The pump is driven through a shaft 14 from any suitable source of power 16. If desired, several pumps and valves may be paralleled, as shown at 12a, 12b, 13a and 13b, respectively, to impart variable capacity to the system. The output from the pump 12 is utilized in a fluid motor 17, which structurally may be identical to the pump 12.

Figure 2:
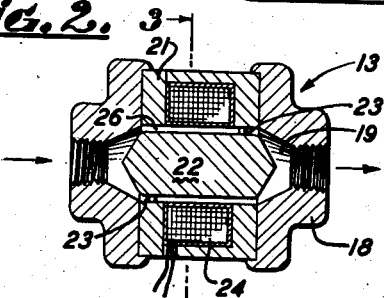
Fig. 2 is a longitudinal cross section of a valve forming a specific feature of the instant invention.
Figure 3:
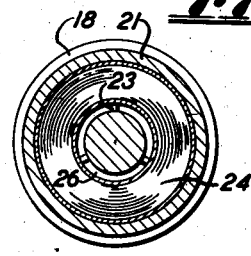
Fig. 3 is a cross section of the valve, taken on line 3—3 of Fig. 2.

One form of the valve 13 is shown in Fig. 2, wherein a body 18, having a longitudinal passage 19 therethrough, is provided with a magnetic member 21, shown in the form of a toroidal shell surrounding the passage 19. A ferro-magnetic member 22 is held spaced from the walls of the passage 19 by non-magnetic spacers 23, and thereby forms an annular passageway 26 through the body 18. A winding 24 is embedded in the member 21 surrounding the passageway 19 and the magnetic member 22, to provide means for creating a magnetic field across the annular portion 26 of the passageway 19 of selectively controllable strength.

When a ferro-magnetic fluid is caused to flow through the passage 19 of the body 18, the extent of fluid blocking in the annular passage 26 is dependent upon the magnetic field strength applied across the passage by the winding 24. In this way, fluid may be allowed to flow virtually unimpeded through the body 18, or may be completely cut off, or any degree of restriction between these limits may be imposed in continuously variable fashion by merely controlling the current in the winding 24.

Figure 4:
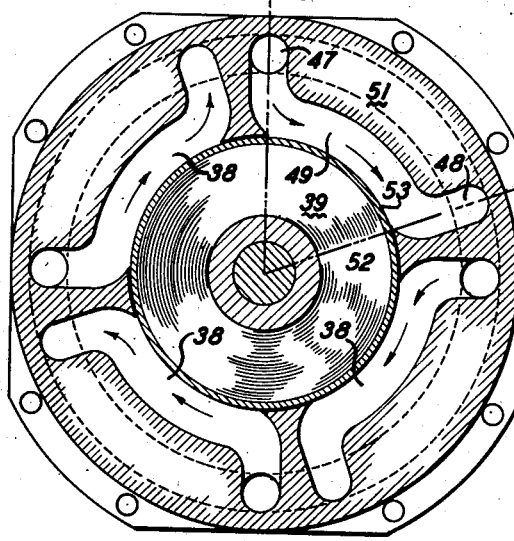
Fig. 4 is a cross section, taken on line 4—4 of Fig. 5, of another specific embodiment of the instant invention, this embodiment being a pump capable of use in the hydraulic system of Fig. 1, and employing certain principles of the instant invention.
Figure 5:
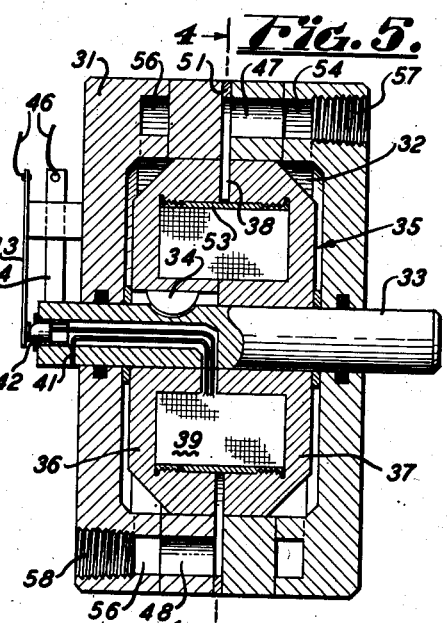
Fig. 5 is a section along the angular line 5—5 in Fig. 4, illustrating the interior of the pump mechanism.

There is also provided a pump for ferro-magnetic fluid, as shown in Figs. 4 and 5, wherein 31 designates a pump body having a cavity 32 therein. The body 31 is of generally cylindrical shape, and passing concentrically therethrough is rotatably mounted a shaft 33, to which is secured by a key 34 a rotor 35 disposed within the cavity 32. The rotor 35 consists of a pair of identical cup-shaped members 36 and 37, mounted on the shaft 33, and facing each other, so that the facing edges of the members 36 and 37 form therebetween an annular gap 38 at the periphery of the rotor. The rotor 35 also includes a winding 39, disposed within the members 36 and 37 circumjacent the shaft 33, one electrical lead from which is grounded to the shaft as shown at 41, the other lead being brought out along the axis of the shaft and terminating in a centrally disposed contact button 42, insulated from the shaft proper. A brush 43 bears axially against the contact button 42, and a brush 44 bears against the shaft 33, so that by means of the leads 46 connected to these respective brushes, electric current may be applied to the winding 39 while the shaft 33 is rotating.

The body 31 has a plurality of passages communicating exteriorly thereof, and with the annular gap 38 of the rotor 35. In the embodiment shown in Fig. 4 there are four such passages, each of which includes an inlet and an outlet. For clarity, only one such passage will be described hereinafter, it being understood that the other passages are substantially identical therewith, being positioned in the other three segments of the body 31 around the rotor 35.

Referring to Fig. 4, one of the passages is shown having an inlet 47 and an outlet 48, the intermediate portion 49 of the passage coinciding with the annular gap 38 of the rotor 35, and being bounded circumferentially by a non-magnetic spacer 51 in which it is formed. The passage 49 is terminated at each end by a non-magnetic tongue or scraper 52, formed integral with the spacer 51 and extending radially inward into the gap 38 as far as the bottom of the gap. The bottom of the gap is formed by a non-magnetic cylinder 53 enclosing the winding 39 and uniting the two halves 36 and 37 of the rotor. The inlet 47 communicates with an annular chamber or passage 54, which also communicates with the inlet portions of each of the other three passages in the body 31. The outlet passage 48, directed opposite to that of the inlet passages, communicates with a similar annular passage 56, as do the outlet passages of each of the other three fluid passages in the body 31. A single threaded inlet hole 57 serves to supply fluid to the annular inlet chamber or passage 54, and a single threaded outlet passage 58 communicating with the passage 56 serves to discharge fluid from all of the four passages in the body 31. In this way the four passages are connected in parallel by means of the respective annular passages 54 and 56.

*Operation of pump*

Use of the apparatus illustrated in Figs. 4 and 5, as a pump, will now be described. Motive means are attached to the shaft 33 so as to turn it in a clockwise direction (Fig. 4). Ferro-magnetic fluid is admitted to the inlet passage 57, from which it feeds directly to each of the four passage inlets 47. Application of electric current to the leads 46 energizes the winding 39, and the resulting magnetic flux in the rotor cup members 36 and 37 creates a magnetic field across the rotor gap 38, which extends around the entire periphery of the rotor, and which is directed parallel to the rotor axis. This field causes the ferro-magnetic fluid, admitted at the inlet 47, to adhere to the rotor 35, so that it is drawn continuously into the gap 38 and around in a clockwise direction, as seen in Fig. 4. Upon encountering the non-magnetic scraper 52, which fills the entire cross-section of the gap, the fluid is scraped from the surface of the rotor 35. The fluid thus disengaged from the rotor loses much of its magnetism and is pushed out the outlet 48 by the still magnetized fluid behind it in the passage 49. In this way, a continuous flow of ferromagnetic fluid is maintained from the inlet 57 to the outlet 58 of the pump.

The coupling between the rotor 35 and the ferro-magnetic fluid may be varied from zero up to a very tight coupling, by adjusting the current in the winding 39. In this way, without changing the speed of the rotor shaft 33, the output of the pump may be varied from zero up to full capacity merely by varying a relatively small current applied to the electrical leads 46. The pump is thus a constant speed, variable displacement device.

Use of the apparatus of Figs. 4 and 5 as a fluid motor instead of as a fluid pump is generally similar, except that the fluid, instead of being merely admitted to the inlet 57, is forced thereinto under pressure. Adhering to the rotor 35 because of the magnetic field, the fluid drags the rotor around in a clockwise direction until it is scraped from the rotor by the scraper 52, and discharged through the passages 48, 56, and 58, thus causing the shaft 33 to turn. As when used as a pump, this application of the apparatus also has the advantage of controllably variable coupling between the rotor and the fluid merely by varying a small current through the coil 39.

The device thus constitutes a means of controlling the flow or pressure of a ferro-magnetic fluid, or, alternatively, if used as a fluid motor, the speed or torque of the motor output by remote control which uses electric power of magnitude very small relative to the power involved in the total operation of the device.

The apparatus thus described has the advantages of simplicity, economy, inherent amplification, and flexibility. Simplicity is achieved by the elimination of valves, closely lapped surfaces, joint gears, and pilot motors. Economy results from the simple construction of the apparatus. The amplification represented by the device is very great; the current supplied to the device represents almost negligible power compared to the power which can be controlled. The flexibility of the device is likewise very broad. It can serve as a pump, a motor, or a brake, virtually without modification, and can serve all three functions alternatively in the same installation.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

A pump for ferro-magnetic fluid comprising a stationary housing, a rotor therein formed of magnetic material with a narrow peripheral passage, means for supplying ferro-magnetic fluid to said passage, means in said rotor for producing a variable magnetic field to cause said fluid to cling to the walls of said passage, and a stationary non-magnetic scraper carried by said housing and extending inwardly in close proximity to the walls of said passage and effective to remove said fluid therefrom and direct it outwardly of the rotor.

FIRTH PIERCE.

References Cited in the file of this patent

UNITED STATES PATENTS

| Number | Name | Date |
|---|---|---|
| 601,957 | Gray | Apr. 5, 1898 |
| 1,047,329 | Sundh | Dec. 17, 1912 |
| 1,069,408 | Gaede | Aug. 5, 1913 |
| 1,674,914 | Murray | June 26, 1928 |
| 1,975,965 | Meyer | Oct. 9, 1934 |
| 2,276,895 | Vosseler et al. | Mar. 17, 1942 |
| 2,279,243 | Parsons | Apr. 7, 1942 |
| 2,405,127 | Beach | Aug. 6, 1946 |
| 2,505,049 | Keller | Apr. 25, 1950 |

OTHER REFERENCES

"The Magnetic Fluid Clutch," in "Bureau of Standards Techanical Report 1213," March 30, 1948. Class 192—Mag. Fluid.

"Magnetized Iron-Oil Mixes," in "Business Week," December 18, 1948, pages 48–50. Class 192—Mag. Fluid.

"New Uses for Magnetic Fluids," in "Bureau of Standards Bulletin," June 19, 1949, pages 74 and 75. Class 192—Mag. Fluid.